United States Patent [19]

Barnum

[11] 3,710,367
[45] Jan. 9, 1973

[54] LAMP FAILURE INDICATOR FOR A DUAL-FILAMENT LAMP

[75] Inventor: Thomas G. Barnum, Birmingham, Mich.

[73] Assignee: General Motors Corporation, Detroit, Mich.

[22] Filed: Oct. 28, 1970

[21] Appl. No.: 84,807

[52] U.S. Cl................340/251, 250/213 A, 315/134
[51] Int. Cl.............................................G08b 19/00
[58] Field of Search............340/251, 82 R; 315/134; 250/209, 213 A

[56] References Cited

UNITED STATES PATENTS

| | | | |
|---|---|---|---|
| 3,541,504 | 11/1970 | Bush | 340/251 |
| 3,579,216 | 5/1971 | Vasel | 340/251 |
| 2,693,551 | 11/1954 | Hall | 340/251 |

*Primary Examiner*—Thomas B. Habecker
*Assistant Examiner*—Marshall M. Curtis
*Attorney*—Paul Fitzpatrick and Jean L. Carpenter

[57] ABSTRACT

A lamp failure indicator for indicating the failure of a low intensity filament of a vehicle taillight, which is energized when the vehicle light switch is closed, and the failure of a high intensity filament of the vehicle taillight, which is energized when the vehicle brake switch is closed. A phototransistor is positioned relative to the vehicle taillight to monitor the light output therefrom. The impedance of the phototransistor is inversely proportional to the total light detected. Resistors are inserted in series with the phototransistor upon the closure of the light switch or the brake switch to form a voltage divider. The resistors have impedances which are related to the impedance of the phototransistor when the low or high intensity filaments are energized so as to bias a first transistor, which receives an input from across the phototransistor, into nonconduction when the filaments selected by the closure of the light switch or brake switch have not failed. Upon the failure of the high or low intensity filament when the light switch or brake switch is closed, the impedance of the phototransistor increases to bias the first transistor into conduction which in turn biases a second transistor into conduction to illuminate an indicator lamp to provide an indication of the failure of the filament.

3 Claims, 1 Drawing Figure

PATENTED JAN 9 1973
3,710,367
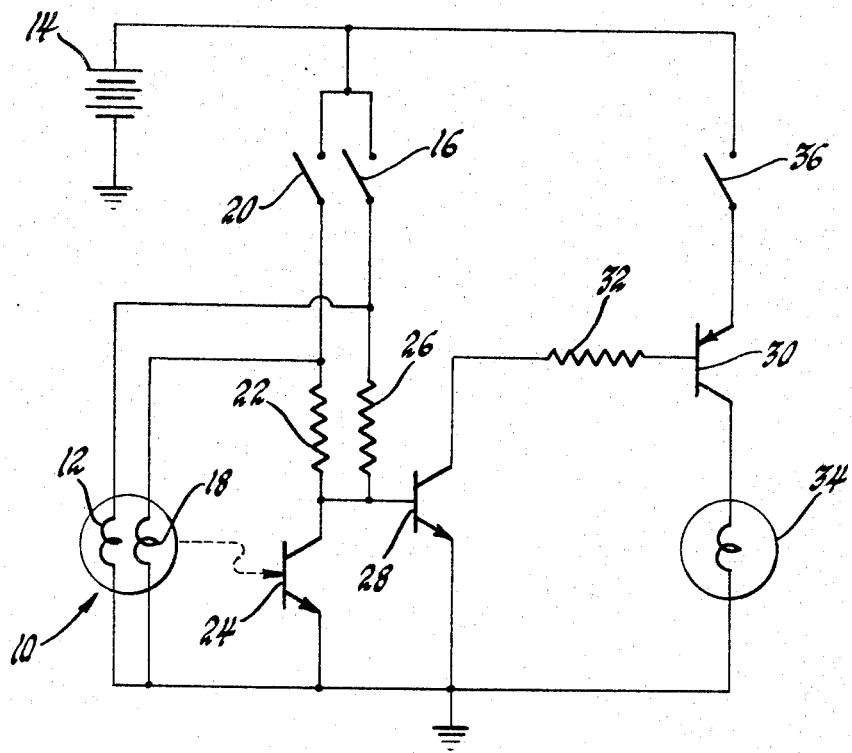
INVENTOR.
Thomas G. Barnum
BY
Paul Fitzpatrick
ATTORNEY

LAMP FAILURE INDICATOR FOR A DUAL-FILAMENT LAMP

This invention relates to a lamp failure indicator and, more specifically, this invention relates to a lamp failure indicator for indicating the failure of one or more filaments in a lamp which are selectively energized.

Lamp failure indicators in which the light output of the lamp is monitored by a light sensing element to provide an indication upon the failure of the filament are known. This form of indicator is sensitive to a specific level of light output and provides an indication when the light output of the lamp being monitored decreases below this level. If the light output of a lamp being monitored is variable, such as in a dual filament lamp having filaments which are selectively energized, this form of indicator would be unable to detect the failure of one or the other filament irrespective of whether the other filament has been energized.

It is an object of this invention to provide for a lamp failure indicator for indicating the failure of the filaments which are selectively energized in a dual filament lamp.

It is another object of this invention to provide for a filament failure indicator utilizing a single light sensor for indicating the failure of one or the other of the filaments in a dual filament lamp in which the filaments are selectively energized, irrespective of the energization of the remaining filament.

These and other objects of this invention are accomplished by varying the impedance of a voltage divider which includes the light sensor in accordance with the intensity of each filament which is energized so as to maintain a transistor biased into non-conduction as long as each filament which is energized has not failed. Upon the failure of a filament which is energized, the impedance of the light sensing element increases to vary the ratio of the voltage divider impedances to bias the transistor into conduction to provide for an indication of the filament failure.

The invention may be best understood by reference to the following description of a preferred embodiment and the FIGURE which is a schematic diagram of the preferred embodiment of this invention.

The preferred embodiment of this invention is hereinafter described with reference to a vehicle taillight having a low intensity filament which is energized through the vehicle light switch and a high intensity filament which is energized through the vehicle brake switch, and is described with reference thereto for illustration purposes only. As will be understood by one skilled in the art, the filament failure indicator described may be used in other applications, such as, for example, vehicle tail lamps utilized in conjunction with vehicle turn signals or any other dual light sources which are selectively energized.

Referring to the FIGURE, a vehicle taillight 10 has a low intensity filament 12 which is connected to ground and to the positive terminal of a vehicle battery 14 through a vehicle light switch 16 which is closed by the vehicle operator to energize the vehicle lights. It also has a high intensity filament 18 which is connected to ground and to the positive terminal of the vehicle battery 14 through a normally open brake switch 20 which is closed by the vehicle operator while braking the vehicle. As can be seen, the voltage of the battery 14 is applied to the low intensity filament 12 when the light switch 16 is closed and the battery voltage is applied to the high intensity filament 18 when the brake switch 20 is closed.

A resistor 22 and a phototransistor 24 form a voltage divider connected in series with the vehicle brake switch 20 and in parallel with the high intensity filament 18 of the taillight 10. A resistor 26 and the phototransistor 24 form a voltage divider connected in series with the vehicle light switch 16 and in parallel with the low intensity filament 12 of the taillamp 10. The characteristics of the phototransistor 24 are such that its impedance varies inversely proportional to the magnitude of the light sensed thereby. The phototransistor 24 therefore has maximum impedance when it senses no light. This form of phototransistor is well known and, therefore, will not be described in greater detail. The phototransistor 24 is positioned relative to the taillight 10 so as to sense the light output thereof when the vehicle light switch 16 or the vehicle brake switch 20 is closed.

The collector electrode of the phototransistor 24 is connected to the base electrode of an NPN transistor 28 whose emitter is connected to ground and whose collector is connected to the base electrode of a PNP transistor 30 through a resistor 32. The collector electrode of the transistor 30 is connected to ground through an indicator lamp 34 and the emitter electrode is connected to one terminal of the vehicle ignition switch 36 whose remaining terminal is connected to the positive terminal of the vehicle battery 14.

When the light switch 16 is closed, a biasing potential is developed on the base of the transistor 28, the magnitude of which is determined by the impedances of the phototransistor 24 and the resistor 26. As the impedance of the phototransistor 24 when illuminated by the low intensity filament 12 is known, the magnitude of the resistor 26 is chosen such that the biasing potential on the base of the transistor 28 is insufficient to bias it into conduction. The increase in the bias on the base of the transistor 28 resulting from the failure of the low intensity filament 12 and the resulting increase in the impedance of the transistor 24 is sufficient to bias the transistor 28 into conduction. In like manner, when the brake switch 20 is closed, a biasing potential is developed on the base of the transistor 28, the magnitude of which is determined by the impedance of the phototransistor 24 and the resistor 22. As the impedance of the phototransistor 24 when illuminated by the high intensity filament 18 is known, the magnitude of the resistor 22 is chosen such that the bias on the base of the transistor 28 is insufficient to bias it into conduction. The increase in the bias on the base of the transistor 28 resulting from the failure of the high intensity filament 18 and the resulting increase in the impedance of the phototransistor 24 is sufficient to bias the transistor 28 into conduction. As can be seen, the magnitudes of the resistors 22 and 26 are determined by the light output of the filaments 18 and 12, respectively. Therefore, the impedance of the resistor 26 must be larger than the impedance of the resistor 22 due to the fact that the impedance of the phototransistor 24 is greater as a result of the light output of the low intensity filament 12 than as a result of the light output of the high intensity filament 18.

When both the light switch 16 and the brake switch 20 are closed, a biasing potential is developed on the base of the transistor 28, the magnitude of which is determined by the impedance of the parallel combination of the resistors 22 and 26 and the impedance of the phototransistor 24. The impedance of the parallel combination of the resistors 22 and 26 is less than the individual impedances thereof and the impedance of the phototransistor 24 due to the total light output of both the low intensity filament 12 and the high intensity filament 18 is less than the impedance resulting from the illumination thereof by either the low intensity filament or the high intensity filament 18 individually. Consequently, the bias on the base of the transistor 28 maintains the transistor 28 into nonconduction. Upon the failure of the high intensity filament 18, for example, the impedance of the phototransistor 24 increases to increase the bias on the base of the transistor 28 to bias it into conduction.

In operation, when the vehicle ignition switch 36 is closed, and the vehicle light switch 16 is closed to illuminate the low intensity filament 12, the transistor 28 will be biased into nonconduction as previously described, if the low intensity filament 12 is operable. The transistor 30 is therefore biased into nonconduction and the indicator lamp 34 will remain extinguished. Upon the failure of the low intensity filament 12, the impedance of the phototransistor 24 increases to increase the bias on the base of the transistor 28 to bias it into conduction. The conduction of the transistor 28 biases the transistor 30 into conduction. Consequently, the indicator lamp 34 is energized to provide an indication of the failure of the low intensity filament 12. If the vehicle light switch 16 is open, and the vehicle brake switch 20 is closed, the transistor 28 will be biased into nonconduction as previously described if the high intensity filament 18 is operable. The transistor 30 is therefore biased into nonconduction and the indicator lamp 34 will remain extinguished. Upon the failure of the high intensity filament 18, the impedance of the phototransistor 24 increases to increase the bias on the base of the transistor 28 to bias it into conduction. The conduction of the transistor 28 biases the transistor 30 into conduction. Consequently, the indicator lamp 34 is energized to provide an indication of the failure of the high intensity filament 18. If the vehicle light switch 16 is closed to illuminate the low intensity filament 12, and the vehicle brake switch 20 is closed to illuminate the high intensity filament 18, the transistor 28 and consequently the transistor 30 will be biased into nonconduction and the indicator lamp 34 will remain extinguished. If the high intensity filament 18 has failed when or during the time the brake switch is closed, the bias on the base of the transistor 28 will increase to bias it into conduction. The transistor 30 is therefore biased into conduction to energize the indicator lamp 34 and provide an indication of the failure of the high intensity filament 18.

As can be seen, the lamp failure indicator previously described may be used to indicate the failure of one or the other or both of two individual lamps such as the lamps on a vehicle dual headlamp system by locating the phototransistor so as to monitor the light output of both lamps. Also, it can be seen that the lamp failure indicator described can be utilized when the light output of the filaments are equal or are at variance, the value of the resistors 22 and 26 being chosen as a function of the light output.

Although the invention has been described as relating to a preferred embodiment, the invention should not be deemed limited thereto, since other embodiments and modifications will readily occur to one skilled in the art.

I claim:

1. A lamp failure indicator for indicating the failure of one or more of a plurality of light sources comprising: a power source; means coupled to the power source and the plurality of light sources for selectively energizing any desired number of the light sources, the desired number of light sources selectively energized having a total light output equal to a certain value for each selected combination when none of said energized light sources have failed and having a total light output less than the certain value when one or more of said selectively energized light sources has failed; light responsive impedance means for monitoring the light output of the light sources, said last mentioned means having an impedance related to the total light output of the selectively energized light sources; a respective second impedance means associated with each of the plurality of light sources; means connected to the means for selectively energizing one or more of the light sources for coupling the second impedance means associated with each selectively energized light source in parallel with one another and in series with the light responsive impedance means and the power source, said coupled second impedance means and the light responsive impedance means forming a voltage divider supplying an output voltage equal to a predetermined constant when the total light output of the selectively energized light sources is at the certain value and varying therefrom when the total light output is less than the certain value; and indicator means responsive to the output voltage for indicating when said output voltage varies from the predetermined constant, whereby said indication represents the failure of one or more of the selectively energized light sources.

2. A lamp failure indicator for indicating the failure of one or more of a plurality of light sources comprising: a power source; means coupled to the power source and the plurality of light sources for selectively energizing any desired number of the light sources, the desired number of light sources selectively energized having a total light output equal to a certain value for each selected combination when none of said energized light sources have failed and having a total light output less than the certain value when one or more of said selectively energized light sources has failed; light responsive impedance means for monitoring the light output of the light sources, said last mentioned means having an impedance inversely proportional to the total light output of the selectively energized light sources; a respective second impedance means associated with each of the plurality of light sources; means connected to the means for selectively energizing one or more of the light sources for coupling the second impedance means associated with each selectively energized light source in parallel with one another and in series with the light responsive impedance means and the power source, said coupled second impedance mans and the light responsive impedance means forming a voltage divider having an impedance ratio equal to X/Y when the total light output of the selectively energized light sources is at the certain value, the impedance ratio decreasing from X/Y when the total light output is less than the certain value; and indicator means responsive to the voltage at the connection between the second impedance means and the light responsive impedance means for indicating when the ratio decreases from X/Y, the indicator means including an NPN transistor having its base electrode coupled to the voltage divider; the transistor being biased into nonconduction when the impedance ratio is X/Y and being biased into conduction when the impedance ratio decreases therefrom, whereby the indication provided is an indication of the failure of one or more of the selected filaments.

3. A lamp failure indicator for indicating the failure of one or both of first and second filaments in a dual filament lamp comprising: means for generating a constant voltage; a variable impedance light responsive means positioned relative to the dual filament lamp for monitoring the light output from the first and second filaments, said variable impedance light responsive means having an impedance inversely proportional to the magnitude of the light output of the first and second filaments; a first resistor serially connected to the variable impedance light responsive means; a second resistor serially connected to the variable impedance light responsive means; first switch means for supplying the constant voltage simultaneously to the first resistor and the first filament, the impedance of the first resistor and the impedance of the variable impedance light responsive means when the first filament only is functioning having a first ratio greater than X/Y, the first ratio being less then X/Y when the first filament has failed; second switch means for supplying the constant voltage simultaneously to the second resistor and the second filament, the impedance of the second resistor and the impedance of the variable impedance light responsive means when the second filament only is functioning having a second ratio greater than X/Y, the second ratio being less than X/Y when the second filament has failed, the first and second resistors having a net parallel impedance when the constant voltage is supplied thereto simultaneously by the first and second switch means, the net parallel impedance and the impedance of the variable impedance light responsive means when both the first and second filaments are functioning having a third ratio greater than X/Y, the third ratio being less than X/Y when one or both of the first and second filaments have failed; an NPN transistor having its base electrode connected between the variable impedance light responsive means and the first and second resistors, the transistor being biased into nonconduction when the first, second or third ratio is greater than X/Y and being biased into conduction when the first, second or third ratio is less than X/Y; and indicator means responsive to the conduction of the transistor for providing an indication of the failure of one or both of the first and second filaments.

* * * * *